(12) United States Patent
Weichselbaum

(10) Patent No.: US 10,192,139 B2
(45) Date of Patent: Jan. 29, 2019

(54) REMOTE TRACKING OF OBJECTS

(71) Applicant: ISRAEL AEROSPACE INDUSTRIES LTD., Lod (IL)

(72) Inventor: Meir Weichselbaum, Moshav Nechalim (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 440 days.

(21) Appl. No.: 14/399,598

(22) PCT Filed: May 8, 2013

(86) PCT No.: PCT/IL2013/050406
§ 371 (c)(1),
(2) Date: Nov. 7, 2014

(87) PCT Pub. No.: WO2013/168169
PCT Pub. Date: Nov. 14, 2013

(65) Prior Publication Data
US 2015/0110345 A1    Apr. 23, 2015

(30) Foreign Application Priority Data

May 8, 2012 (IL) .......................................... 219639

(51) Int. Cl.
*H04N 5/232* (2006.01)
*G06K 9/62* (2006.01)
(Continued)

(52) U.S. Cl.
CPC .......... *G06K 9/6201* (2013.01); *G01S 3/7864* (2013.01); *H04N 5/232* (2013.01);
(Continued)

(58) Field of Classification Search
CPC ... G06T 2207/30232; G06T 7/70; G06T 7/20; G06T 7/73; G06T 2207/10016;
(Continued)

(56) References Cited

U.S. PATENT DOCUMENTS 4,162,775 A    7/1979 Voles
4,405,940 A    9/1983 Woofson et al.
(Continued)

FOREIGN PATENT DOCUMENTS

EP    0423984 B1    6/1996
EP    0606173 B1    4/1997
(Continued)

OTHER PUBLICATIONS

K. Nummiaro et al., "An adaptive color-based particle filter," Image and Vision Computing xx, pp. 1-12 (2002).

*Primary Examiner* — Andrew Moyer
*Assistant Examiner* — Dennis Rosario
(74) *Attorney, Agent, or Firm* — Browdy and Neimark, PLLC

(57) ABSTRACT

The presently disclosed subject matter includes a tracking system and method which for tracking objects by a sensing unit operable to communicate over a communication link with a control center which enables to execute a command generated at the control center with respect to a selected object in an image captured by the sensing unit, notwithstanding a time-delay between a time when the sensing unit acquires the image with the selected object, to a time when the command is received at the sensing unit with respect to the selected object.

22 Claims, 7 Drawing Sheets

(51) Int. Cl.
  *G01S 3/786* (2006.01)
  *H04N 7/18* (2006.01)
  *G06K 9/32* (2006.01)

(52) U.S. Cl.
  CPC ........ *H04N 7/18* (2013.01); *G06K 2009/3225* (2013.01); *H04N 5/23206* (2013.01)

(58) Field of Classification Search
  CPC .... H04N 1/2112; H04N 5/2628; H04N 5/225; H04N 7/181; H04N 7/183; H04N 7/185; H04N 5/23203; H04N 5/232; H04N 5/23206; H04N 21/4223; H04N 5/247; H04N 5/23296; G06F 19/3418; H04L 67/12; H04L 67/125; H04L 67/025; G06K 2009/3225
  See application file for complete search history.

(56) References Cited

U.S. PATENT DOCUMENTS

| | | |
|---|---|---|
| 4,405,943 A | 9/1983 | Kanaly |
| 4,409,661 A | 10/1983 | Romanski |
| 4,537,370 A | 8/1985 | Pizzuro |
| 4,661,849 A | 4/1987 | Hiaman |
| 4,682,225 A | 7/1987 | Graham |
| 4,710,813 A | 12/1987 | Wallis et al. |
| 4,739,401 A | 4/1988 | Sacks et al. |
| 4,805,018 A | 2/1989 | Nishimura et al. |
| 4,843,568 A | 6/1989 | Krueger et al. |
| 4,855,822 A | 8/1989 | Narenda et al. |
| 4,868,871 A | 9/1989 | Watson, III |
| H741 H | 2/1990 | Powell et al. |
| 4,898,341 A | 2/1990 | Terzian |
| 4,925,274 A | 5/1990 | James et al. |
| 4,959,741 A | 9/1990 | Ota et al. |
| 4,975,960 A | 12/1990 | Petajan |
| 4,996,592 A | 2/1991 | Yoshida |
| 5,036,474 A | 7/1991 | Bhanu et al. |
| 5,062,056 A | 10/1991 | Lo et al. |
| 5,103,484 A | 4/1992 | Stafford et al. |
| 5,119,190 A | 6/1992 | Lenelson |
| 5,149,980 A | 9/1992 | Ertel et al. |
| 5,155,683 A | 10/1992 | Rahim |
| 5,216,408 A | 6/1993 | Shirakawa |
| 5,275,354 A | 1/1994 | Minor et al. |
| 5,280,530 A | 1/1994 | Trew et al. |
| 5,317,319 A | 5/1994 | Fagarasan et al. |
| 5,323,470 A | 6/1994 | Kara et al. |
| 5,340,309 A | 8/1994 | Roberston |
| 5,341,143 A | 8/1994 | Reis et al. |
| 5,355,325 A | 10/1994 | Uhlmann |
| 5,365,236 A | 11/1994 | Fagarasan et al. |
| 5,371,536 A | 12/1994 | Yamaguchi |
| 5,390,133 A | 2/1995 | Sohie |
| 5,392,225 A | 2/1995 | Ward |
| 5,406,328 A | 4/1995 | Chodos et al. |
| 5,422,829 A | 6/1995 | Pollock |
| 5,424,823 A | 6/1995 | Nettles et al. |
| 5,434,617 A | 7/1995 | Bianchi |
| 5,450,503 A | 9/1995 | Ogino et al. |
| 5,489,099 A | 2/1996 | Rankin et al. |
| 5,557,685 A | 9/1996 | Schlossers et al. |
| 5,564,650 A | 10/1996 | Tucker et al. |
| 5,574,498 A | 11/1996 | Sakamoto et al. |
| 5,602,760 A | 2/1997 | Chacon et al. |
| 5,626,311 A | 5/1997 | Smith et al. |
| 5,647,015 A | 7/1997 | Choate et al. |
| 5,714,999 A | 2/1998 | Jeong et al. |
| 5,761,326 A | 6/1998 | Brady et al. |
| 5,785,275 A | 7/1998 | Hiebl |
| 5,870,486 A | 2/1999 | Choate et al. |
| 5,940,830 A | 8/1999 | Ochitani |
| 5,949,481 A | 9/1999 | Sekine et al. |
| 5,990,822 A | 11/1999 | Honigsbaum et al. |
| 6,044,166 A | 3/2000 | Bassman et al. |
| 6,061,055 A | 5/2000 | Marks et al. |
| 6,064,332 A | 5/2000 | Cloutier |
| 6,079,862 A | 6/2000 | Kawashima et al. |
| 6,088,060 A | 7/2000 | Suda et al. |
| 6,122,405 A | 9/2000 | Khani |
| 6,154,559 A | 11/2000 | Beardsley |
| 6,199,471 B1 | 3/2001 | Perruzzi et al. |
| 6,208,758 B1 | 3/2001 | Ono et al. |
| H1980 H | 8/2001 | Cloutier |
| 6,271,752 B1 | 8/2001 | Vaios |
| 6,272,484 B1 | 8/2001 | Martin et al. |
| 6,404,937 B1 | 6/2002 | Agata et al. |
| 6,445,832 B1 | 9/2002 | Lee et al. |
| 6,449,019 B1 | 9/2002 | Fincher et al. |
| 6,507,366 B1 | 1/2003 | Lee |
| 6,515,689 B1 | 2/2003 | Terashima |
| 6,624,846 B1 | 9/2003 | Lassiter |
| 6,672,535 B2 | 1/2004 | Brunner et al. |
| 6,681,061 B2 | 1/2004 | Agata et al. |
| 6,724,915 B1 | 4/2004 | Toklu et al. |
| 6,728,404 B1 | 4/2004 | Ono et al. |
| 6,757,328 B1 | 6/2004 | Huang et al. |
| 6,778,171 B1 | 8/2004 | Kikinis |
| 6,822,676 B1 * | 11/2004 | Kurosawa .......... H04N 5/23203 348/207.1 |
| 6,840,627 B2 | 1/2005 | Olbrich |
| 7,184,574 B1 | 2/2007 | Zahavi |
| 7,312,766 B1 | 12/2007 | Edwards |
| 7,362,352 B2 * | 4/2008 | Ueyama ................ H04N 5/232 348/207.1 |
| 7,454,067 B1 | 11/2008 | Patl |
| 7,620,483 B2 | 11/2009 | Florentin et al. |
| 7,643,064 B1 | 1/2010 | Jouppi |
| 7,761,173 B2 | 7/2010 | Ehrlich |
| 7,860,276 B2 * | 12/2010 | Anai ..................... G06T 7/0028 382/107 |
| 8,854,473 B2 * | 10/2014 | Shih ....................... H04N 7/185 348/169 |
| 9,413,941 B2 * | 8/2016 | Bekiares .......... H04N 5/23203 |
| 2002/0030741 A1 | 3/2002 | Broemmelsiek |
| 2002/0037770 A1 | 3/2002 | Paul et al. |
| 2002/0054211 A1 | 5/2002 | Edelson et al. |
| 2002/0080159 A1 | 6/2002 | Montgomery |
| 2002/0140813 A1 | 10/2002 | Trajkovic et al. |
| 2002/0140814 A1 | 10/2002 | Cohen-Solal et al. |
| 2002/0168091 A1 | 11/2002 | Trajkovic |
| 2002/0180878 A1 | 12/2002 | Iida et al. |
| 2002/0186221 A1 | 12/2002 | Bell |
| 2002/0191081 A1 | 12/2002 | Ueyama |
| 2003/0035051 A1 | 2/2003 | Cho et al. |
| 2003/0051597 A1 | 3/2003 | O'Dwyer |
| 2004/0156561 A1 | 8/2004 | Yu-Chuan et al. |
| 2005/0004759 A1 | 1/2005 | Siegel |
| 2005/0077469 A1 | 4/2005 | Kaushal |
| 2005/0119801 A1 | 6/2005 | Florentin et al. |
| 2006/0227862 A1 | 10/2006 | Campbell et al. |
| 2006/0262365 A1 * | 11/2006 | Imao .................... H04N 5/232 358/527 |
| 2007/0197229 A1 | 8/2007 | Kalliola et al. |
| 2008/0252722 A1 | 10/2008 | Wang et al. |
| 2008/0267451 A1 | 10/2008 | Karazi |
| 2009/0129631 A1 | 5/2009 | Faure et al. |
| 2010/0149332 A1 | 6/2010 | Wang |
| 2011/0026774 A1 | 2/2011 | Flohr et al. |
| 2011/0130114 A1 * | 6/2011 | Boudville ................ H04W 4/00 455/404.2 |
| 2011/0310219 A1 | 12/2011 | Kim et al. |
| 2012/0019660 A1 | 1/2012 | Golan et al. |
| 2012/0062732 A1 * | 3/2012 | Marman .................. H04N 7/18 348/142 |
| 2015/0110345 A1 * | 4/2015 | Weichselbaum ...... G01S 3/7864 382/103 |
| 2015/0378000 A1 | 12/2015 | Bar David et al. |

(56) References Cited

U.S. PATENT DOCUMENTS

FOREIGN PATENT DOCUMENTS

| | | |
|---|---|---|
| EP | 2117225 B1 | 5/2012 |
| IL | 169345 | 6/2005 |
| IL | 169346 | 6/2005 |
| IL | 169347 | 6/2005 |
| IL | 147370 | 7/2007 |
| IL | 134206 | 8/2007 |
| KR | 10-2011-0098288 | 9/2011 |
| WO | 99/60335 | 11/1999 |
| WO | 00/46985 | 8/2000 |
| WO | WO 03060416 A1 * | 7/2003 ........... G05D 1/0022 |
| WO | 2012/010887 | 1/2012 |

* cited by examiner

REMOTE TRACKING OF OBJECTS

FIELD OF THE PRESENTLY DISCLOSED SUBJECT MATTER

The presently disclosed subject matter is relates to the remote tracking of objects.

BACKGROUND

In many applications, an operator of a system for surveillance and remote tracking of objects controls a remote image sensor via a communication link. Examples are traffic control, border control, search and rescue operations, land surveys, police surveillance, military applications, etc. Operators may additionally request measurements of a remotely tracked object, such as motion parameter measurements and the like.

In general, a system for surveillance and remote tracking of objects comprises a control center at one end and a remote sensing unit at the other end which communicate over a communication link. The sensing unit, with the help of an image sensor, can be used for surveying a scene including one or more objects, and transmitting sensing-data, which includes data that was acquired by the sensing unit or data generated by the sensing unit in relation to the acquired data (e.g. image pictures, object-data characterizing identified objects etc.), to a control center where the images can be displayed on a display for viewing by an operator. Furthermore, the sensing unit can be operable to locate and track a sighted object. The control center provides to the sensing unit control data, including for example, different types of commands, such as track command, zoom-in command, centering command, etc.

According to one possible scenario, in case an operator of the control center decides that it is desirable to track an object in the scene, he initiates a sequence of operations directed for that purpose. The operator can first send instructions (including for example pointing instructions being a type of control data) to the sensing unit which identify the object that should be tracked. The pointing instructions are coarse pointing instructions which are generated manually by the operator and include for example, "move up", "move right", "zoom" or similar commands. In response, the sensing unit acts upon these instructions, and directs the image sensor towards the required area.

The operator can send additional control data including for example a lock and track command (including locking instructions) directing a sensing unit to lock on a selected object in the scene. In response, the sensing unit receives the instructions and attempts to lock onto the object indicated in the command.

Once the object has been locked, sensing unit takes over command and commences to operate in response to tracking instructions, which are generated within the sensing unit and are directed for tracking the locked object. The tracking instructions are forwarded to the image sensor which in turn tracks the moving object and keeps the object in the center of FOV of the display, even while the object moves relative to the sensing unit.

In many applications, there is a time-delay between the time when the sensing unit acquires an image of an object, to when the image is displayed on the display located at the control center, and further to the time the corresponding instructions are received at the sensing unit. Factors that can contribute to the delay include for example, signal processing, image compression/decompression, duration of the communication, and/or link bandwidth limitations. Consequently, when taking into account the delayed reaction time of the operator, the accumulated delayed time can be from fractions of a second to several seconds.

Due to this time-delay, the location of the object as displayed on the display at the control center is generally not the current location of the object. The location displayed on the display is the location of the object before the transfer of the sensing-data from the sensing unit to the control center (e.g. x seconds ago). Additionally, by the time the sensing unit receives the control data from the control center and generates the instruction for the image sensor, an additional time-delay occurs, (e.g. an additional y seconds). Consequently, by the time image sensor is instructed to locate the object, the object may no longer be in the same location it was when the image picture was taken over x+y seconds ago.

Clearly, this time-delay complicates the efforts to lock onto the object. The operator has to accurately calculate and estimate the expected location of the object at a time in the future when the instructions arrive at the sensing unit. Only then is the sensing unit directed to the calculated estimated location, and a lock and tracking operation can be initiated.

If the calculation of the estimated location is not sufficiently accurate, the sensing unit will lock onto some other background object and the entire estimate, calculate and lock process has to be repeated. As such, the effect is a continuous feedback control loop with delay, a situation which is liable to suffer from overshoots and instability.

The locking process is complicated even more in case of human input in the tracking loop. Humans do not function well in feedback loops with time-delay and their reactions and directions are less precise than, for example, computer or processor generated instructions.

Publications considered to be relevant as background to the presently disclosed subject matter are listed below. Acknowledgement of the references herein is not to be inferred as meaning that these are in any way relevant to the patentability of the presently disclosed subject matter.

U.S. Pat. No. 7,184,574 discloses a tracking apparatus including a sensor tracker and a control tracker (60). The sensor tracker is connected to a sensor which senses a scene having at least one object therein, the sensor tracker provides sensor movement instructions to the sensor, enabling it to track a selected object. The control tracker is located remotely from and communicates with the sensor tracker. Additionally, the control tracker takes measurements regarding the selected object and provides tracking instructions to the sensor tracker. The sensor tracker then utilizes the tracking instructions to adjust the sensor movement instructions, when necessary.

US Patent Publication No. 2008267451 discloses a method for tracking an object that is embedded within images of a scene, including: in a sensor unit that includes a movable sensor, generating, storing and transmitting over a communication link a succession of images of a scene. In a remote control unit, the succession of images is received. Also disclosed is receiving a user command for selecting an object of interest in a given image of the received succession of images and determining object-data associated with the object and transmitting through the link to the sensor unit the object-data. In the sensor unit, the given image of the stored succession of images and the object of interest using the object-data are identified, and the object in the other image of the stored succession of images is tracked. The other image is later than the given image. In case the object cannot be located in the latest image of the stored succession of images, information of images in which the object was located are used to predict estimated real-time location of the object, and direction command is generated to the movable sensor for generating real-time image of the scene and locking on the object.

EP Patent No. 0423984 discloses a synergistic tracker system which includes both a correlation tracker and an object tracker for processing sensing-data input and for generating tracking error signals. The operation of the synergistic tracker system is controlled by a central processing unit. The system operates by first correlating a reference region image with a portion of a current digitized image provided by analog to digital converter. Secondly, the object tracker provides a precisely defined track point for an object within the current image. The correlation tracker stabilizes and limits the portion of the digitized image that the object tracker must operate upon. Stabilizing and limiting this portion of the digitized image reduces the object tracker's sensitivity to background clutter and sensitivity to a loss of lock induced by sensor motion. The object tracker provides a non-recursive update for the correlation's reference region image. The correlation tracker and the object tracker are used simultaneously and cooperatively so that the strengths of one tracker are used to overcome the weaknesses of the other. This invention provides a greater tracking tenacity, a reduction in tracker angle noise, and a reduction in hardware complexity.

U.S. Pat. No. 7,620,483 relates to a method for guiding from a remote control center a vehicle towards a target object, said remote control center communicating with the vehicle by means of a lagged communication channel, comprising: At the vehicle: (a) Periodically capturing frame images by a camera, assigning to each of said captured frames an associated unique time stamp, and saving within a storage at the vehicle full frame data or partial frame data of captured frames and their associated time stamps; (b) For a plurality of saved frames, sending to the control center via the lagged communication channel full frame data, partial frame data or a combination thereof with the corresponding associated time stamp for each sent frame so that approximate or exact version of the sent frames can be reconstructed and displayed at the control center; At the control center: (c) Receiving said frame data and associated time stamps, sequentially reconstructing frame images from each said sent full and/or partial frame data, and displaying the reconstructed images on a display; (d) Upon marking by an operator at the control center a point on a specific displayed frame, sending coordinates indication relating to said marked point as appearing on said specific frame or on a reference frame available at the control center, and the time stamp associated with said specific or reference frame, as is the case, to the vehicle; At the vehicle: (e) Receiving said coordinates indication as marked and the sent frame time stamp; (f) Given the coordinates indication and frame time stamp as received, fast forward tracing said point or object coordinates from the said frame towards the most recently available captured frame, thereby finding the coordinates of the same point or object as appearing in the most recently available captured frame; and (g) Providing the coordinates of the target point or object within the most recently available captured frame, as found, to an inner guidance sub-system of the vehicle, for enabling it to track said object.

SUMMARY

According to the presently disclosed subject matter there is provided a tracking system comprising: a sensing unit operable to communicate over a communication link with a control center, the sensing unit comprising an image sensor operable to capture a succession of images of a scene; the sensing unit being operable to identify one or more objects in an image in the succession of images; assign an object-tag to at least one of the objects thereby generating a respective tagged object; and send sensing-data to the control center, the sensing-data including at least the image; the sensing unit is further operable to trace the tagged object, from an earlier image in the succession of images to a later image in the succession of images, thereby maintaining a given object-tag associated with its respective tagged-object along the succession of images; responsive to a command received from the control center including at least one object-tag indicative of a selected object, to identify, with the help of the at least one object-tag, the selected object in a latest available captured image in the succession of images.

According to certain embodiments the sensing unit is operable to store the object tag along with data indicative of the position of the respective tagged object; and in case the position in a earlier image is changed in a later image, the sensing unit is operable to update the stored data.

According to certain embodiments the tracking system further comprises the control center; the control center is operable to receive the image from the sensing unit; identify one or more objects in the image, assigns an object-tag to at least one of the objects thereby generating a parallel tagged object, stores the object-tag in association with the parallel tagged object; and the identification and assigning is performed in the sensing unit and the control center according to identical principles.

According to certain embodiments the tracking system further comprises an object locating module operable, in case the selected object is not located inside a field of view of the image sensor, to estimate a real-time location of the selected object; and generate direction commands to the image sensor, such that the selected object is located in a real-time image of the scene generated by the image sensor.

According to certain embodiments the tracking system further comprises an automatic object recognition unit operable to: determine one more characteristics of the one or more identified objects; and select an object to be assigned with a respective object-tag, in case one or more characteristics of the object match a predefined criterion.

According to certain embodiments the tracking system further comprises an automatic object recognition unit operable, responsive to a received screening command including data indicative of at least one selected object, to: determine object-data of the at least one selected object; select one or more objects to be assigned with a respective object-tag from among the one or more identified objects, in case object-data of the one or more identified object match the object-data of the at least one selected object.

According to another aspect of the presently disclosed subject matter there is provided a method of tracking objects by a sensing unit operable to communicate over a communication link with a control center, the method comprising: receiving information indicative of a succession of images of a scene; identifying one or more objects in an image in the succession of images; assigning an object-tag to at least one of the objects thereby generating a respective tagged object; sending sensing-data to the control center, the sensing-data including at least the image; tracing the tagged object, from an earlier image in the succession of images to a later image in the succession of images, thereby maintaining a given object-tag associated with its respective tagged-object along the succession of images; responsive to a command received from the control center, the command including at least one object-tag indicative of a selected object, identifying, with the help of the at least one object-tag, the selected object in a latest captured image in the succession of images.

According to certain embodiments the method further comprises storing the object tag along with data indicative of the position of the respective tagged object; and updating the stored data, in case the position in a earlier image is changed in a later image.

According to certain embodiments the method further comprises in case the selected object is not located inside a field of view of the image sensor, estimating a current location of the selected object; and generating direction commands to the image sensor, such that the selected object is located in a real-time image of the scene generated by the image sensor.

According to certain embodiments the method further comprises determining one more characteristics of the one or more identified objects; and selecting an object to be assigned with a respective object-tag, in case one or more characteristics of the object match a predefined criterion.

According to certain embodiments the method further comprises responsive to a received command, including data indicative of at least one selected object: determining object-data of the at least one selected object; selecting one or more objects to be assigned with a respective object-tag from among the one or more identified objects, in case object-data of the one or more identified object match the object-data of the at least one selected object.

According to certain embodiments the method further comprises receiving at the control center a captured image from the sensing unit; displaying the image on a display; responsive to a selection of an object in the image and a first command issued in association with the object: identifying a object-tag associated with the object; generating a second command, the command including the object-tag; and transmitting the second command to the sensing unit.

According to another aspect of the presently disclosed subject matter there is provided a program storage device readable by machine, tangibly embodying a program of instructions executable by the machine to perform method steps of tracking objects by a sensing unit operable to communicate over a communication link with a control center, the method comprising: receiving information indicative of a succession of images of a scene, captured with the help of an image sensor; identifying one or more objects in an image in the succession of images; assigning an object-tag to at least one of the objects thereby generating a respective tagged object; storing the object-tag in association with the respective tagged object; sending sensing-data to the control center, the sensing-data including at least the image; responsive to a command received from the control center, the command including at least one object-tag indicative of a selected object, identifying, with the help of the at least one object-tag, the selected object in a latest captured image in the succession of images.

According to another aspect of the presently disclosed subject matter there is provided a tracking system comprising: a sensing unit operable to communicate over a communication link with a control center, the sensing unit comprising an image sensor operable to capture a succession of images of a scene; the sensing unit being operable to store the succession of images and transmit part or all of captured images in the succession of images to the control center; responsive to a command received from the control center, the command including object-data indicative of at least one selected object, selected in a given image, the sensing unit is operable to: identify the given image in the succession of images, including: obtaining a time-delay between the time when the given image is captured at the sensing unit until the time the command with respect to the given image, is processed at the sensing unit; identifying, based on the time-delay, the given image in the succession of images, the given image being a previous image which was captured at a time preceding the time of the latest image by a period of time substantially equal to the time-delay; identifying the at least one selected object in the given image; tracing the at least one selected object from the given image along the succession of images and thereby identify the at least one selected object in a latest available captured image in the succession of images.

According to certain embodiments the sensing unit is operable to determine, based on the time delay and a frame rate of the image sensor, a number of images captured since the given image was captured; and identify the given image in the succession of images based on the number of images.

According to certain embodiments the time delay is provided in terms of N number of images captured during a period of time of the time delay; the sensing unit is operable to search for the given image which is located N images earlier than the latest captured image.

According to another aspect of the presently disclosed subject matter there is provided a method of tracking objects by a sensing unit operable to communicate over a communication link with a control center, the method comprising: receiving information indicative of a succession of images of a scene; storing the succession of images in a data-repository associated with the sensing unit; transmitting part or all of acquired images in the succession of images to a control center; responsive to a command received from the control center, the command including object-data indicative of at least one selected object, selected in a given image, identify the given image in the succession of images, including: obtaining a time-delay between the time when the given image is captured at the sensing unit until the time the command with respect to the given image, is processed at the sensing unit; identifying, based on the time-delay, the given image in the succession of images, the given image being a previous image which was captured at a time preceding the time of the latest image by a period of time substantially equal to the time-delay; identifying the at least one selected object in the given image; tracing the at least one selected object from the given image along the succession of images and thereby identify the at least one selected object in a latest available captured image in the succession of images.

According to certain embodiments the method further comprising: determining, based on the time-delay and a frame rate of the image sensor, a number of images captured since the given image was captured; and identifying the given image in the succession of images based on the number of images.

According to certain embodiments the time delay is provided in terms of N number of images captured during a period of time of the time-delay; the method comprising searching for the given image which is located N images earlier than the latest captured image.

According to another aspect of the presently disclosed subject matter there is provided a program storage device readable by machine, tangibly embodying a program of instructions executable by the machine to perform method steps A method of tracking objects by a sensing unit operable to communicate over a communication link with a control center, the method comprising: receiving information indicative of a succession of images of a scene; storing the succession of images in a data-repository associated with the sensing unit; transmitting par or all of acquired images in the succession of images to a control center; responsive to a command received from the control center, the command including object-data indicative of at least one selected object, selected in a given image, identify the given image in the succession of images, including: obtaining a time-delay between the time when the given image is captured at the sensing unit until the time the command with respect to the given image, is processed at the sensing unit; identifying, based on the time-delay, the given image in the succession of images, the given image being a previous image which was captured at a time preceding the time of the latest image by a period of time substantially equal to the time-delay; identifying the at least one selected object in the given image; tracing the at least one selected object from the given image along the succession of images and thereby identify the at least one selected object in a latest available captured image in the succession of images.

BRIEF DESCRIPTION OF THE DRAWINGS

In order to understand the presently disclosed subject mater and to see how it may be carried out in practice, embodiments will now be described, by way of non-limiting example only, with reference to the accompanying drawings, in which.

DETAILED DESCRIPTION

Figure 1:
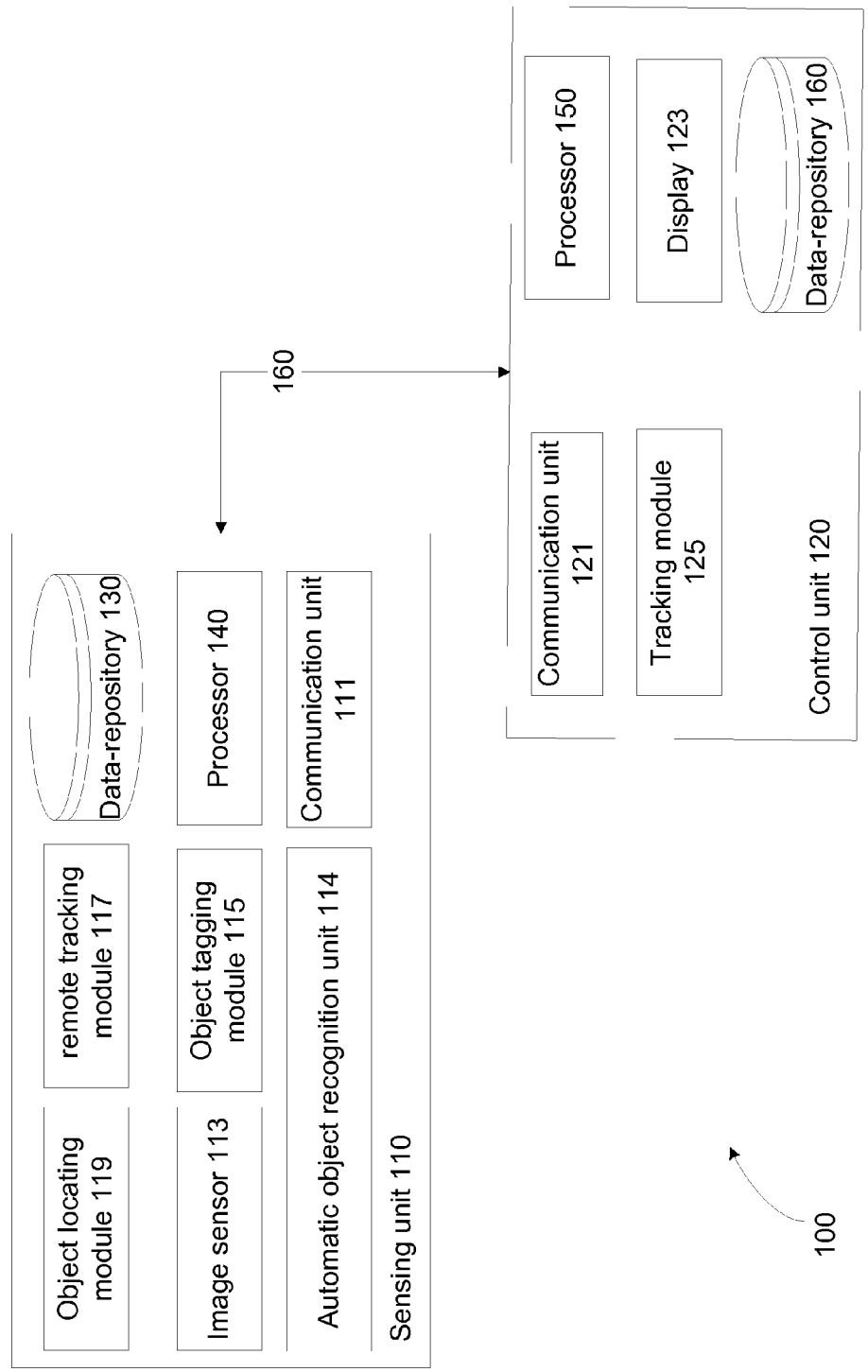
FIG. 1 is a functional block diagram schematically illustrating a tracking system, in accordance with the presently disclosed subject matter.

In the drawings and descriptions set forth, identical reference numerals indicate those components that are common to different embodiments or configurations. Unless specifically stated otherwise, as apparent from the following discussions, it is appreciated that throughout the specification discussions utilizing terms such as "identifying", "assigning", "sending", "receiving", obtaining", "transmitting" or the like, include action and/or processes of a computer that manipulate and/or transform data into other data, said data represented as physical quantities, e.g. such as electronic quantities, and/or said data representing the physical objects.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

It should be noted that the term "criterion" as used herein should be expansively construed to include any compound criterion, including, for example, several criteria and/or their logical combinations.

Figure 2:
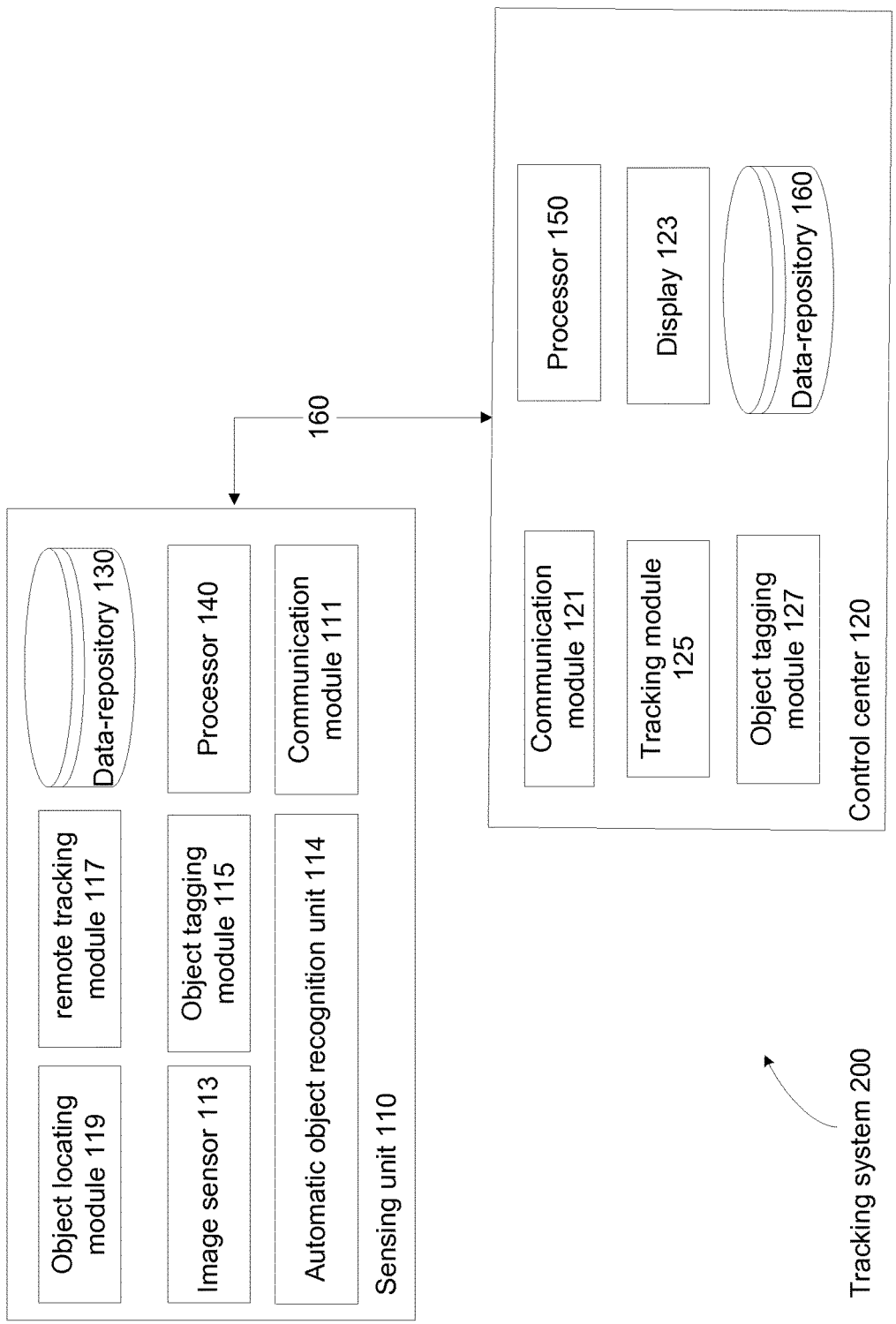
FIG. 2 is another functional block diagram schematically illustrating a tracking system, in accordance with the presently disclosed subject matter.

FIGS. 3, 4, 5 and 7 are flowcharts illustrating operations of respective processes, in accordance with the presently disclosed subject matter. In embodiments of the presently disclosed subject matter, fewer, more and/or different stages than those shown in FIGS. 3, 4, 5 and 7, may be executed. In embodiments of the presently disclosed subject matter one or more stages illustrated in FIGS. 3, 4, 5 and 7, may be executed in a different order and/or one or more groups of stages may be executed simultaneously. FIGS. 1, 2 and 6 illustrate a general schematic of the system architecture in accordance with an embodiment of the presently disclosed subject matter. Each module in FIGS. 1, 2 and 6 can be made up of any combination of software, hardware and/or firmware that performs the functions as defined and explained herein. The modules in FIGS. 1, 2 and 6 may be centralized in one location or dispersed over more than one location. In different examples of the presently disclosed subject matter, the system may comprise fewer, more, and/or different modules than those shown in FIGS. 1, 2 and 6.

Bearing the above in mind, attention is now drawn to FIG. 1 showing a functional block diagram schematically illustrating a tracking system, in accordance with the presently disclosed subject matter. FIG. 1 shows tracking system 100 comprising a sensing unit 110 and control center 120 communicating over a communication link 160. Sensing unit 110 and control center 120 can be located remotely from each other. For example, control center 120 can be located on the ground while sensing unit 110 is located onboard an Unmanned Aerial Vehicle or Unmanned Ground Vehicle. Communication between sensing unit 110 and control center 120 can be facilitated for example, with the help of communication module 111, located in sensing unit 110 and communication module 121 located at the control center 120.

According to the teaching disclosed herein, sensing unit 110 further comprises an image sensor 113, an object-tagging module 115, and data-repository 130 (e.g. non-transitory computer memory). Image sensor 113 can be any device operable for acquiring information with respect to a scene, including for example an image sensing device such as a camera, radar (e.g. Synthetic Aperture Radar), sonar, laser, etc.

An image which is captured by image sensor 113 is transmitted to object-tagging module 115 which is operable to identify objects appearing within the image and assign to part or all of the identified objects a tag (herein "object-tag") which uniquely identifies the object. The term "object" as used herein should be broadly interpreted to include any type of identifiable object in an image of a scene or part thereof, including also a discernible group of pixels (e.g. a moving group of pixels, or a group of pixels characterized by a discernible temperature in respect of the surrounding scene). An object-tag can be any number, name, character, insignia, icon etc. which can be assigned to an object and can be used for identifying the object.

In the following discussing an object assigned with a tag is referred to as a "tagged object". The image, the object-tags of the tagged objects, and possibly additional respective object-data can be stored in data-repository 130. The term "object-data" includes one or more characteristics of objects such as, coordinates with respect to the acquired image and/or coordinates with respect to its global positioning, object's velocity, object's size, object's temperature, object's color, object's shape, correlation data and any information which enables to identify an object with a given image.

Optionally, not all objects in a scene are tagged by tagging module 115. Rather, specific objects can be selected based on different parameters. For example, specific objects can be selected with the help of a computer program configured to select objects in a scene which match some criterion. To this end, sensing unit 110 can be equipped with an automatic object recognition unit (AOR) 114.

AOR unit 114 is operable to select objects in a scene, to be tagged with respective object-tags, based on the characteristics of the objects. The AOR unit 114 can be preprogrammed with predefined characteristics of sought after objects. Such characteristics can include for example, size of an object, whether the object is in motion (e.g. with the help of video motion detection (VMD) algorithm as known in the art) or stationary, velocity of an object in motion, temperature emanating from an object, etc. AOR unit 114 can be operationally connected to sensing devices (e.g. image sensor 113) and receive from the sensing devices information with respect to objects in the viewed scene. AOR unit 114 can be operable to analyze the received information and determine the characteristics of objects in the scene. AOR unit 114 can then compare these characteristics with the predefined characteristics of the sought after object. Objects having characteristics matching the predefined characteristics are selected by AOR unit 114. It should be noted that the term "object recognition" (including, but not limited to recognition executed by AOR unit 114 as disclosed herein) should be broadly interpreted to include both the identification of a specific type of object in an image of a scene (e.g. car, building, person, etc.) as well as the mere detection of an object in image of scene, for example the detection of a moving group of pixels or a group of pixels characterized by a discernible temperature in respect of the rest of the scene.

According to the presently disclosed subject matter, AOR unit 114 can be operable to transmit to object-tagging module 115 information indicative of objects which are selected by AOR unit 114. In turn object-tagging module 115 can be operable to tag the object (or objects) selected by AOR unit 114.

Once one or more objects (and in some cases a plurality of objects) in a captured image are identified and tagged, sensing-data, including at least the captured image is transmitted via communication module 111 to control center 120. According to the example described with reference to FIG. 1, sensing-data also includes the assigned object-tags along with additional object-data with respect to the tagged objects which can include correlation data which enables to associate an objects-tag with a respective object in the captured image (e.g. their respective coordinates in the image). Object-tags can be transmitted to control center 120 for example as an overlay of the respective image (i.e. as part of the image data) or as additional information to the image.

Object-tagging module 115 is further configured to receive a succession of images captured by image sensor 113 and trace the tagged objects from an earlier image to a later image along the succession of images, thereby maintaining each object-tag associated with its respective tagged-object along the succession of images and enabling to track tagged objects from one image to the next along the succession of images. If the position of a tagged object is changed, the respective stored location of the tagged object (e.g. in data-repository 130) is updated accordingly. During the operation of image sensor 113 new objects, which enter the FOV of image sensor 113, are detected and assigned with respective object-tags.

Methods for tracing objects from an earlier image to a later image along a succession of images are well known in the art and include for example, center of gravity identification, edge detection, correlation etc. Note that as used herein the term "later" includes an image which is captured at a later time than an image captured at an earlier time (i.e. an earlier image). The term "later image" includes, but is not limited to, a consecutive image.

Sensing-data is received by communication module 121 in control center 120 and can be displayed on display 123 (e.g. LCD screen). Sensing-data can also be stored in data-repository 160. One or more objects can be selected (herein after "selected object") in an image displayed at control center 120 and a command can be generated with respect to the one or more objects. For example, an operator can generate a tracking command which instructs sensing unit 110 to track the selected object. An object can be selected by any means known in the art for example, by pointing or otherwise marking an object of interest with the help of an input device associated with control center 120. The input device can be for example, a mouse, a touch pad, a stick, a touch screen or any other device or method enabling interaction with the display.

Once an object is selected, tracking module 125 can be configured to identify the object-tag which has been assigned to the selected object and incorporate the object-tag in the generated command. The command is transmitted back to sensing unit 110. The command (i.e. control data) includes at least the object-tag of the selected object and possibly also the command type. Different types of commands can be generated with respect to an object (e.g. at control center 120) including for example, a command to zoom in on a selected object, a command to mark a selected object, a command to obtain data with respect to a certain parameter (e.g. velocity) of a selected object, etc.

A command is received by sensing unit 110 and transmitted to remote tracking module 117. Remote tracking module 117 can be configured to process the command and extract from the command the object-tag (or object-tags) assigned to the selected object or objects. Remote tracking module 117 can be further configured to receive from object-tagging module 115 the latest available captured image (i.e. most recently captured image which is available for processing) along with the associated object-tags, and with the help of the object-tag, received together with the command, to locate the selected object within the image. Once the object is located in the current image, the issued command can be executed. For example, in case of a zooming command, appropriate instructions can be sent to sensing unit 113 to zoom on the selected object. Remote tracking module 117 can continue and track the object along a succession of later images as they are being captured by the image sensor 113 and transmitted to remote tracking module 117.

Thus, the tracking system and method disclosed herein enables to locate an object selected in an image displayed at the control center, and execute a command with respect to the selected object, notwithstanding a time-delay between the time the sensing unit acquired the image to a time when the command is received from the control center, at the sensing unit with respect to the selected object.

Optionally, an operator can issue a screening command comprising information indicative of the characteristics of a sought-after object. A screen command can include for example information indicative of at least one selected object. Responsive to a screening command received at sensing unit 110, AOR unit 114 can be configured to analyze the data indicative of a selected object and obtain the respective object-data of the selected object. For example, AOR unit 114 can be configured to determine the size, color and velocity of an object indicated in a screening command. Once the object-data of the selected objects are available AOR unit 114 can be configured to search and tag other objects in the scene that match (i.e. with identical object-data or similar object-data with some degree of freedom) the object-data of the objects in the screening command.

For example, assuming an operator selected a truck appearing in an image of a scene which is displayed on display 123, respective control data is sent back to sensing unit 110 and transmitted to AOR unit 114, which in response analyzes the truck and obtains its characteristics. The characteristics can include for example, the size of the truck and its shape. Once the characteristics of the truck (object-data) are available, a command is sent to tagging module 115 to tag other objects in the scene with similar size and shape.

In addition, according to the presently disclosed subject matter, in some cases a command can be automatically issued with respect to objects which are automatically recognized by AOR unit 114. For example, a tracking command can be automatically generated with respect to any object which travels at a velocity which is greater than a predefined speed. A command can be automatically generated in either sensing unit 110 or control center 120. To this end in some cases an AOR unit 114 can be additionally or alternatively located, in control center 120.

Furthermore, sensing unit 110 and control center 120 can be provided with a map of the area which is being surveyed. The map can be any kind of map such as a topographical map of the area or a grid or image of some sort (e.g. aerial photograph). The map provides reference points which are common to sensing unit 110 and control center 120 and can help in providing instruction to sensing unit 110. These common reference points can be utilized for example, for sending commands to sensing unit directing the image sensor to a stationary location indicated by a reference point on the map. Sensing unit can be operable to receive a command from control center 120, which includes instructions to direct the image sensor to a stationary location on the map. In additional, directions can be made by indicating a reference point on the map and the distance of a required location from that reference point. Sensing unit 110 can be operable to identify the reference point and the associated required location in an identical map and generate instructions directing image sensor 113 to the required location.

FIG. 2 is another functional block diagram schematically illustrating a tracking system, in accordance with the presently disclosed subject matter. FIG. 2 presents an additional approach to the one illustrated with reference to FIG. 1. In FIG. 2 both remote sensing unit 110 and control center 120 comprise an object-tagging module (115 and 127 respectively). Accordingly, similar operations are performed by object-tagging module 115 and object-tagging module 127. A captured image is transmitted from image sensor 113 to both object-tagging module 115 in sensing unit 110 and to object-tagging module 127 in control center 120. The same logic is used by both object-tagging modules for identifying objects within the image and for assigning tags to (part or all of) the identified objects. For better clarity, tagged objects which are tagged by object tagging module 127 can be also referred to as "parallel tagged objects".

As both object-tagging modules (115 and 127) receive the same images and operate according to the same principles, the same objects are identified and tagged with identical tags by both object-tagging modules. This enables to maintain a coordinated scheme of tagged objects in sensing unit 110 and control center 120. In case objects are selectively tagged in sensing unit 110 (e.g. with the help of an AOR unit 114) a similar screening process is executed in control center 120.

The image, the object-tags of the tagged objects within the image, and possibly also their respective characteristics (e.g. coordinates, color, size, etc.) can be stored in data-repository 130 in sensing unit 110 and in data repository 160 in control center 130. In contrast to the example illustrated above with reference to FIG. 1 since identical object-tags are generated by both sensing unit 110 and control center 120, there is no need for sensing unit 110 to send the assigned object-tags to control center 120.

As before, once an object is selected at control center 120, tracking module 125 can be configured to identify the object-tag which has been assigned to the selected object and incorporate the object-tag in a generated command. The command is transmitted to remote tracking module 117 which operates as disclosed above.

Furthermore, in some cases, both object-tagging module 115 and object-tagging module 127 can be made operable to trace the tagged objects from an earlier image to a later image along the succession of images, thereby maintaining each object-tag associated with its respective tagged-object along the succession of images captured by image sensor 113. Object-tagging module 127 is operable to receive from sensing unit 110 later images captured by image sensor 113 and trace the tagged objects from an earlier image to a later image. A more detailed description of the operations executed by sensing unit 110 and control center 120 is disclosed below with reference to FIGS. 3 to 5.

Figure 3:
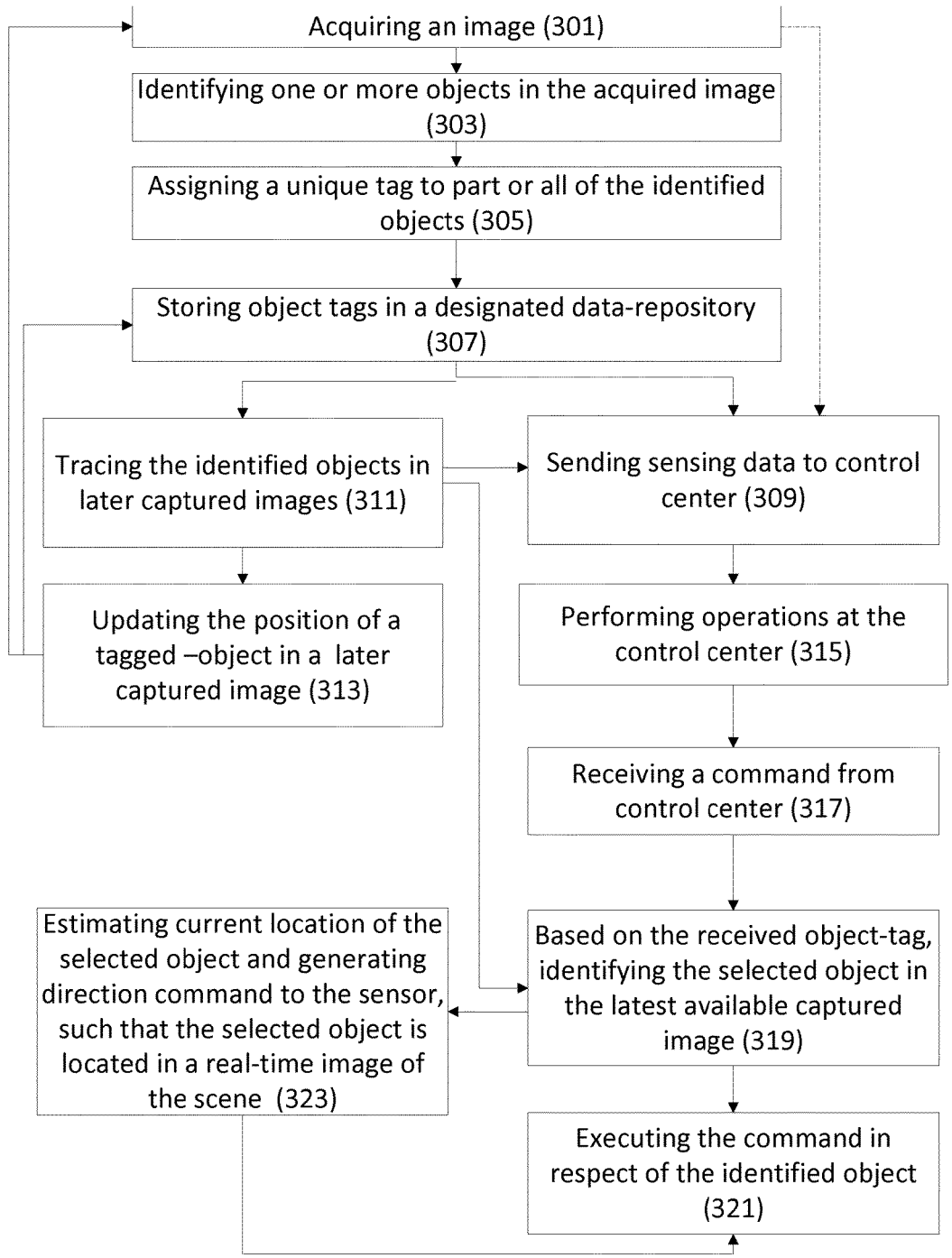
FIG. 3 is a flowchart illustrating operations performed by a sensing unit, in accordance with the presently disclosed subject matter.

FIG. 3 is a flowchart illustrating operations performed by the sensing unit, in accordance with the presently disclosed subject matter. At block 301 an image is acquired by image sensor 113 located at sensing unit 110. The acquired image is processed at the sensing unit and one or more (or a plurality of) objects within the image are identified (block 303).

Methods for identifying objects within an image are well known in the art and therefore shall not be discussed here any further. However, it is noted that an object can be identified in relation to one or more characteristics of the object in the image, such as size, shape, temperature, whether the object is moving or stationary, velocity, and the like. In case more than one image is required in order to identify an object (e.g. in case objects are identified based on their velocity) this can be accomplished by capturing a succession of two or more images, storing these images, and using multiple images for identifying objects, as is well known in the art. To this end, objects in an image can be analyzed in order to determine their respective characteristics such as size, shape, velocity, color etc. The velocity and trajectory of tagged objects can also be calculated and stored (e.g. in data repository 130). This information can be later facilitated for tracing an object of interest, in case it drifts out of frame and is no longer located in the FOV of image sensor 113 as explained in more detail below.

Once the objects within the acquired image are identified, objects are assigned with respective object-tags which uniquely identify the object (block 305). This task can be accomplished for example with the help of object-tagging module 115. In some cases, every object in the acquired image is tagged with a respective tag. In other cases only part of the objects in the acquired image are tagged. Objects in an acquired image can be screened based on a predefined criterion, where only those objects which meet the criterion are tagged by sensing unit 110. For example, objects can be screened based on size (e.g. tagging an object only if its size is greater than a predefined value), based on shape (e.g. tagging an object only if its shape matches a predefined shape), based on temperature (e.g. tagging an object only if it emits temperature which is greater than a predefined temperature value), based on whether the object is motion or stationary (which can be determined as mentioned above with the help of a Video Motion Detection algorithm), based on velocity (e.g. tagging an object only if it travels at a velocity greater than a predefined velocity). Objects can also be screened based on their dispersion across the image, for example, only a single object is tagged from among a plurality of identified objects within an acquired image, in case the objects are gather together such that distance between the plurality of objects is less than a predefined distance. As mentioned above, objects in acquired images can be screened with the help of AOR unit 114. The object-tags assigned to the objects in the image and optionally also object-data, can be stored in data-repository 130 (block 307). For example, the data can be stored in a data structure (e.g. hash table) which associates x, y coordinates indicating the position of an object within an acquired image i and an object-tag assigned to that object. Optionally, the acquired image can be stored as well, however this is not always necessary and in some cases a previously captured image are discarded once a newer image is captured and the objects and respective object-tags are traced to the newer image.

Sensing-data is sent to control center 120 (block 309). Sensing-data includes at least the acquired image. In case control center 120 is configured with a local object-tagging module as described with reference to FIG. 2, there is no need to send information with respect to the object-tags to control center 110 and accordingly sensing-data does not include this information. In such a case, an acquired image can be sent to control center immediately after it has been captured, before the tagging process at the sensing unit 110 is completed.

Otherwise, in case control center 120 is not configured with a local object-tagging module, sensing-data includes at least, an acquired image, and the assigned object-tags associated with objects in the image. Sensing-data can also include object-data with respect to the tagged objects, including for example coordinates indicating the location of each tagged object within the acquired image, and possibly other characteristics of the tagged objects (e.g. shape, size, temperature, color etc).

Images of the scene are continuously captured by image sensor 113 and the objects identified in an earlier acquired image are traced (e.g. with the help of object-tagging module 115) in later captured images (block 311). Methods of tracing objects from an earlier image to a later image in a succession of images are well known in the art and therefore shall not be discussed herein in any further.

The position of objects in an earlier image may change in later images due to movement of the object, movement of the sensing unit and/or movement of the image sensor. Accordingly, sensing unit 110 is configured to trace each tagged-object from an earlier image to a later image in the succession of images captured by image sensor, and determine its position (e.g. x and y coordinates) of the object in the later image.

At block 313 it is determined whether the position of the object in the later image is different than the position of the image in the earlier image, and in case the information indicating the position of the object is updated and the updated position of the object is associated with the respective object-tag (e.g. in data repository 130). This enables sensing unit 110 to maintain each object-tag associated with its respective tagged-object along the succession of images and locate a tagged object in the latest available captured image based on its assigned object-tag, even if its position shifts from one image to another.

Sensing-data including later images and updated object-data (including for example updated location of tagged objects) is continuously (e.g. according to the order they are captured) sent to control center 120 (block 309). Block 315 refers to the operations which are executed by control center 120, which are described in more detail below with reference to FIGS. 4 and 5.

A command generated at control center 120, is received in sensing unit 110 (block 317). As mentioned above the command includes at least one object-tag identifying a selected object and possibly also instructions to execute an action. In response to the command, sensing unit 110 is operable to locate the object which is identified by the respective object-tag incorporated in the command, in the latest available captured image (block 319). According to one example, in order to identify the selected object in the latest available captured image, sensing unit (e.g. with the help of remote tracking module 117) can be operable, to use the received object-tag, search data repository 130 for the object-tag, find the updated position of the respective tagged object and use its most updated position in order to locate the tagged object in the latest available captured image.

Once the object is identified in the latest available captured image, sensing unit 110 executes the command with respect to the identified object (block 321). For example, in case of a command instructing to track an object, sensing unit (e.g. with the help of remote tracking module 117) can generate instructions for image sensor 113 to lock on and track the object identified by the object-tag specified in the command.

In some operational scenarios, objects which are identified and tagged by object-tagging module 115 in an earlier acquired image, may drift out of the field of view (FOV) of the image sensor and consequently only partially appear, or even completely disappear from later images. Thus, due to the time-delay mentioned above, it may occur that by the time a command, associated with a certain object-tag is received at sensing unit 110, the respective tagged object may not appear in the latest available captured image.

Thus, according to the presently disclosed subject matter sensing unit 110 can optionally comprise an object locating module 119 which is operable to estimate the current location of a selected object selected which is not located in the latest captured image (by the time the command reaches sensing unit 110), and generate direction commands to the image sensor for locating the object and generating a real-time image that includes the object.

Different methods for estimating the current location of the sought after object can be employed by object locating module 119. One such method is disclosed in US Patent Publication No. 2008267451 which is incorporated herein by reference. According to this method the current location of the object is estimated, e.g. by calculating the trajectory that the object has traveled so far. According to one example, the trajectory of an object can be determined based on the trajectory of the object in a succession of previous images, and, based on the so determined trajectory, estimating the current location of the object in the latest available captured image, using known per se trajectory estimation techniques. As mentioned above, the trajectory and velocity of tagged objects can be calculated and stored (e.g. in data repository 130), and utilized by object locating module 119 to estimate real-time location of an object.

Having determined the estimated location of the object, appropriate commands can be generated (e.g. by object locating module 119) for directing the FOV of image sensor 113 towards the estimated location of the object. For example, providing appropriate direction commands to a gimbal mechanism to which image sensor 113 is attached, allowing the sensor to acquire real-time image that includes the selected object. Note that commands generated for repositioning a gimbal mechanism should also take into consideration a time interval of the duration it takes for directing the image sensor to the desired new location for acquiring a real-time image which includes the object (including for example, time required for mechanically/electronically redirecting the image sensor).

It should be noted that the presently disclosed subject matter is not bound by any specific object trajectory determination and/or estimation techniques. It should be further noted that the trajectory determination disclosed herein does not necessarily require utilizing succession of images comprising a certain number of images. Any two or more images can be utilized to this end and the so utilized images are not necessarily consecutive.

Reverting to block 319 in FIG. 3, in case the selected object cannot be located in the latest available captured image, the estimated real-time location of the object is estimated and direction commands are generated for image sensor 113, such that the object is located in a real-time image of the scene generated by image sensor 113 (block 323). As before, once the object is identified in the latest available captured image, sensing unit 110 executes the command with respect to the identified object (block 321).

Figure 4:
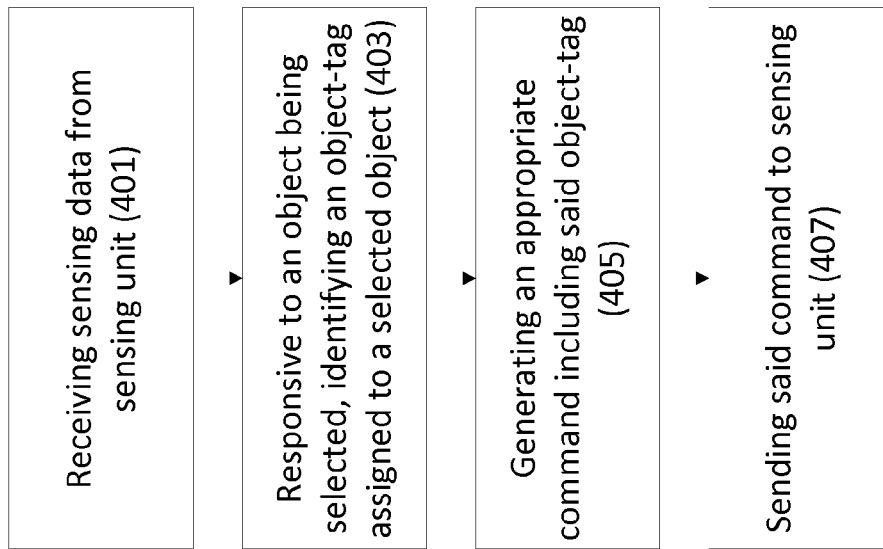
FIG. 4 is a flowchart illustrating operations performed by a control center, in accordance with the presently disclosed subject matter.

The flowchart in FIG. 4 illustrates operations performed by the control center, in accordance with the presently disclosed subject matter. FIG. 4 demonstrates operations which are executed by control center 120 configured in accordance with the example illustrated in FIG. 1, i.e. without a local object-tagging facility. Control center 120 can be operable to continuously receive sensing-data from sensing unit 110 (block 401). The sensing-data which is received by control center 120 comprises at least an acquired image along with information including one or more object-tags assigned to respective one or more tagged objects within the image. The objects-tags can be associated with the respective objects in the image based on the location of the objects in the image. Thus, sensing-data can also include for example, data indicative of the location of the tagged objects with respect to the image or with respect to its global positioning. This information can be stored in a data repository associated with control center 120.

Responsive to an object (or objects) being selected in control center 120, the object-tag which was assigned by sensing unit 110 to the selected object is identified (block 403). For example the sensing-data can include an image, one or more object-tags and the updated location of each of the respective tagged objects within the image. This enables control center 120 to associate between a selected object to its corresponding object-tag based on the location of the object within the image. In another example, object-tags can be incorporated as an overlay of the image such that object tags can be associated to their respective objects within the image.

An appropriate command is generated, including the object-tag of the selected object (block 405). For example, in case an operator selects an object and initiates a command instructing to track the selected object, a tracking command including the object-tag of the selected object is generated in control center 120 (e.g. with the help of tracking module 125). Optionally, in addition to the object-tag, the command can also include object-data characterizing the object which can be used by sensing unit 110 in order to verify that the correct object is selected by sensing unit and no errors are made.

The generated command is sent to sensing unit 110 (block 407), which is operable to process the command and execute its respective instructions as described above.

Figure 5:
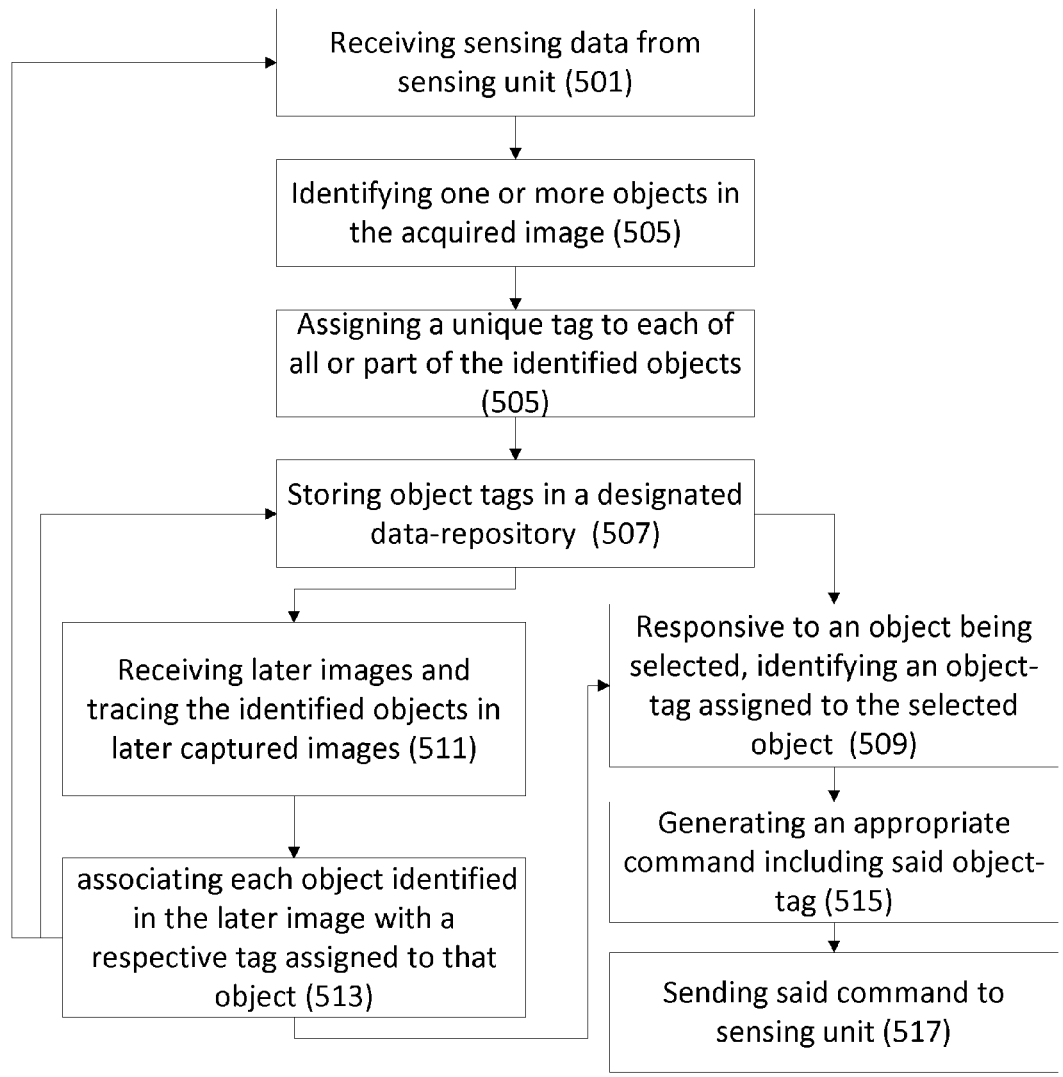
FIG. 5 is another flowchart illustrating operations performed by a control center, in accordance with the presently disclosed subject matter.
Figure 6:
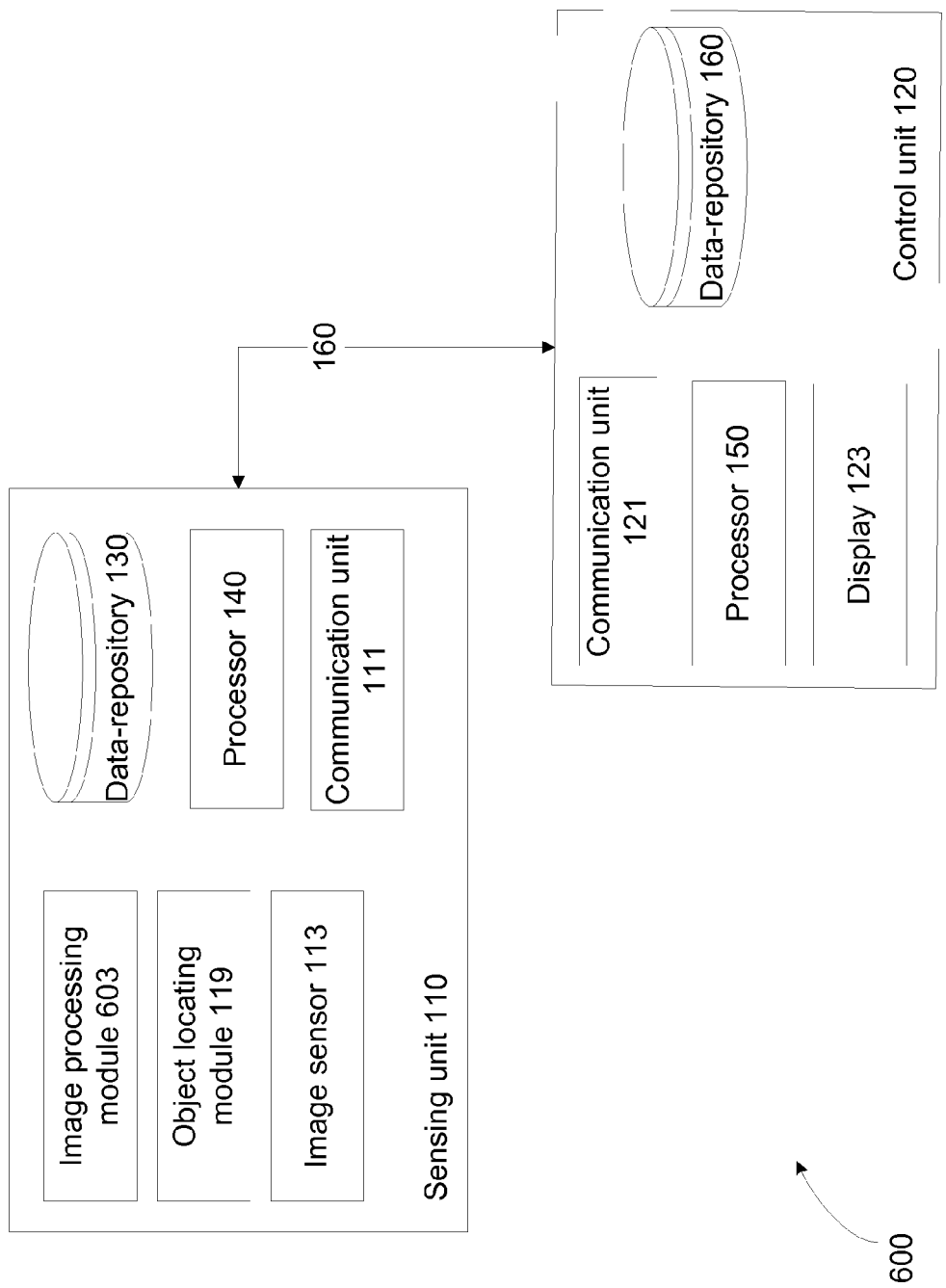
FIG. 6 is another functional block diagram schematically illustrating a tracking system, in accordance with the presently disclosed subject matter.

FIG. 5 shows another flowchart illustrating operations performed by the control center, in accordance with the presently disclosed subject matter. In contrast to FIG. 4, FIG. 5 demonstrates operations which are executed by a control center 120 configured with a local object-tagging facility as shown in FIG. 2. At block 501, control center 120 receives sensing-data from sensing unit 110. In this case sensing-data includes an image acquired by the sensing unit, but does not include information with respect to object-tags of identified objects within the acquired image. Object-tagging module 127 in control center 120 is operable to duplicate the operations which are executed by object-tagging module 115 in the sensing unit. Accordingly, the same operations which were described above with reference to block 303 to block 307 are repeated in control center 120. At block 503 the received image in the sensing-data is processed and one or more (or a plurality of) objects within the image are identified. Once the objects within the received image are identified, each object is assigned with an object-tag which uniquely identifies the object, thereby generating parallel tagged objects at the control center (block 505). Information with respect to the object-tags assigned to the objects in the image and optionally also in respect of the acquired image can be stored in data-repository 160 (block 507).

In order to generate identical information in both sensing unit 110 and control center 120, the same principles are maintained during the processing of the captured images in sensing unit 110 and the control center 120. For example, the rules used for tagging the objects is uniform, in order to ensure that identical object-tags are assigned to identical objects in both the sensing unit and control center. Also in case objects are screened, the same screening policy is executed by both the sensing unit and the control center in order to ensure that the same subset of objects is retained after the screening in both the sensing unit and control center.

As later images are transmitted from sensing unit 110 to control center 120, control center is also operable to trace the tagged objects from an earlier image to a later (recent) image, as was earlier explained above with reference to blocks 311 and 315 (block 511 and block 513).

Operations described with reference to blocks 509, 515 and 517 are similar to the operations described above with reference to blocks 403, 405 and 407, respectively. Responsive to an object being selected in control center 120, the object-tag which was assigned by control center 120 to the selected object is identified (block 509). An appropriate command is generated, including the object-tag of the selected object (block 515) and the generated command is sent to sensing unit 110 (block 517).

Turning now to another approach disclosed herein, which enables to overcome the problems specified above, which result from a time-delay which exists between the time the sensing unit acquires a given image to a time when a command is generated at the control unit with respect to an object in the acquired given image and to the time the command is received at the sensing unit.

FIG. 6 is a functional block diagram schematically illustrating a tracking system, in accordance with the presently disclosed subject matter. Similar to the systems illustrated earlier in FIG. 1 and FIG. 2, FIG. 6 shows tracking system 600 comprising a sensing unit 110 and control center 120 communicating over a communication link 160. As above, sensing unit 110 and control center 120 can be located remotely from each other and communication between sensing unit 110 and control center 120 can be facilitated for example, with the help of communication module 111, located in sensing unit 110 and communication module 121 located at the control center 120.

According to the teaching disclosed herein, sensing unit 110 further comprises an image sensor 113, an image processing module 603, and data-repository 130 (e.g. non-transitory computer memory). An image which is captured by image sensor 113 is stored in data-repository 130. A succession of captured images is stored in data-repository 130 such that the order according to which the images were captured can be later retraced. For example, the captured images can be inserted into a stack or array according to a predefined order e.g. according to the order that they are captured, where an earlier captured image is inserted to a stack before a later captured image.

Sensing-data, including at least the captured image is transmitted via communication link 160 to control center 120. According to one example described with reference to FIG. 6, sensing-data can include only the captured image or it can also include some type of object-data.

Sensing-data is received by communication module 121 in control center 120 and can be displayed on display 123 (e.g. LCD screen). Sensing-data can also be stored in data-repository 160. One or more objects can be selected (hereinafter "selected object") in a given image displayed at control center 120. After an object is selected in a displayed image a command can be generated with respect to the selected object(s). For example, an operator can generate a tracking command which instructs sensing unit 110 to track the selected object. An object can be selected by any means known in the art, for example by an operator pointing or otherwise marking an object of interest with the help of an input device associated with control center 120. The input device can be for example, a mouse, a touch pad, a stick, a touch screen or any other device or method enabling interaction with the display.

Once an object is selected and a command is generated at control center 120 the command is transmitted back to sensing unit 110. The command (i.e. control data) includes some type of object-data which enables to identify the selected object(s). As explained above, the term "object-data" includes one or more characteristics of an object, such as coordinates of the object with respect to the acquired image and/or coordinates with respect to its global positioning, object's velocity, object's size, object's temperature, object's color, object's shape, correlation data or any other type of data which enables to identify an object within a given image.

Different types of commands can be generated with respect to an object (e.g. at control center 120) including for example, a command to zoom in on a selected object, a command to mark a selected object, a command to obtain data with respect to a certain parameter (e.g. velocity) of a selected object, etc.

A command is received by sensing unit 110 and transmitted to image processing module 603. Image processing module 603 is operable to identify in the succession of images stored in data repository 130 the previous image which was displayed to the operator when the object was selected (referred to herein also as "the previous image of interest"). To this end image processing module 603 utilizes an estimated duration of the time-delay i.e. a duration of time between the time when the previous image of interest was captured at the sensing unit 110 until the time a command with respect to that image, generated at control center 120, is received at sensing unit 110.

For example, this calculation can be based on the following time estimation parameters:
  the estimated duration of time it takes an image, once captured, to be transmitted from sensing unit 110 to control center 120;
  the estimated duration of time it takes control center to generate a command in response to an instruction received at control center 120;
  the estimated duration of time it takes an image to be transferred back to sensing unit 110 from control center 120; and
  the estimated processing time in sensing unit 110 (e.g. the processing time of the command).

Additional or alternative time estimation parameters can be used as well (for example the processing time of calculating the time-delay as described herein may also be considered).

In some cases the time-delay can be a substantially constant duration of time which is provided as input data to image processing module 603, while in other cases image processing module 603 can be operable to calculate the time-delay. Optionally, in order to calculate the time-delay system 600 can be operable to utilize a predefined calibration image. Sensing unit 110 can be operable to send a predefined calibration image (e.g. a fully black image or an image with a known object at a known position within the image) to the control center 120 (e.g. in response to a request issued at control unit 120). When the image reaches the control center 120 a signal is returned to sensing unit 110. The duration of time (or the number of frames captured during this time) from the transmission of the calibration image from sensing unit 110 to control center 120 to the time the signal returned from control center 120 is received at sensing unit 110 is measured (e.g. by image processing module 603). This measured duration of time can be indicative of the time-delay.

Once obtained, the time-delay can be used to locate, in the succession of captured images stored in data-repository 130, the previous image of interest which was displayed to the operator when the object was selected.

According to one example the frame rate of the image sensor can be used by processing module 603 to determine the number of frames which were captured during the calculated time-delay. Once the number of frames is determined, processing module 603 can be operable to locate the previous image (frame) of interest. For example, assuming image sensor 113 has a frame rate of 40 frames per second and the calculated time-delay equals to half a second, the previous image of interest is an image captured 20 images before the most recently captured image.

According to another example, image processing module 603 can be operable to assign to each image a time-tag indicating the time it was captured. Image processing module 603 can be operable to identify a previous image of interest by calculating its time-tag. This can be accomplished for example by subtracting the time-delay from the current time or from the time-tag of the most recently captured image. For example, in case the time-tag of the most recently captured image is 11:30:46:770 (i.e. hour:minuntes:seconds:miliseconds) and the time-delay equals to 500 milliseconds, image processing module 603 would search for a previous image in the succession of images having a time-tag of 11:30:46:220 (or the closest time-tag).

According, to another example, the time-delay can be expressed and provided to images processing module 603 in terms of a number of images rather than in terms of actual time. Thus, assuming that a substantially constant time-delay occurs, and assuming that based on the frame rate of image sensor 113, this time-delay is equivalent to a number of (N) frames, image processing module 603 can be provided with a time-delay of N frames. In this case image processing module 603 can be operable to search for the previous image of interest which is located N images earlier than the latest captured image. Thus, it should be understood that the term "time-delay" as used herein includes an actual time-delay and also any equivalent thereof, such as a number of images which are captured during the time delay.

As mentioned above, the received command includes object-data which enables to identify the object in the image. Now that the previous image of interest has been identified, this information can be used for locating the selected object in the image. Additional object-data (e.g. size, shape, etc.) can be also used to help in the identification of the selected object in the image.

Optionally, in order to compensate for inaccuracies in the calculation of the time-delay and the process of determining the identified previous image (which may result for example from the dynamic nature of the system), image processing unit 603 can be configured to search for the selected object in a subset of images within the succession of images adjacent to the now identified previous image of interest. For example, the subset of images may include one or more (e.g. 3) images preceding the identified previous image of interest, the identified previous image of interest, and one or more images (e.g. 3) following the previous image of interest.

Also, image processing unit 603 can be configured to first search for the selected object (or objects) in the previous image of interest and proceed and search in adjacent images in the stored succession of images, in case the object is not found in the previous image of interest.

Once the selected object is identified in a previous image in the stored succession of images, image processing module 603 can be configured to trace the selected objects from the previous image of interest to a later image along the succession of images, thereby enabling to track the selected object from one image to the next along the succession of images up to the latest available captured image (i.e. most recently captured image which is available for processing). Methods for tracing objects from an earlier image to a later image along a succession of images are well known in the art and include for example, center of gravity identification, edge detection, correlation etc. Note that as used herein the term "later" includes an image which is captured at a later time than an image captured at an earlier time (i.e. an earlier image). The term "later image" includes, but is not limited to, a consecutive image.

Once the selected object is identified in the latest available image, the command can be executed with respect to the object.

Similar to what was explained above with reference to FIGS. 1 and 2, in some operational scenarios, objects which are identified in a previously acquired image, may drift out of the field of view (FOV) of the image sensor and consequently only partially appear, or even completely disappear from later images. Thus, due to the time-delay mentioned above, it may occur that by the time a command, associated with a certain selected object is received at sensing unit 110 the selected object may not appear in the latest available captured image.

Thus, according to the presently disclosed subject matter sensing unit 110 can optionally comprise an object locating module 119 which is operable to estimate the current location of a selected object selected which is not located in the latest captured image (by the time the command reaches sensing unit 110), and generate direction commands to the image sensor for locating the selected object and generating a real-time image that includes the selected object. An example of the operation of object locating module 119 is specified above.

Figure 7:
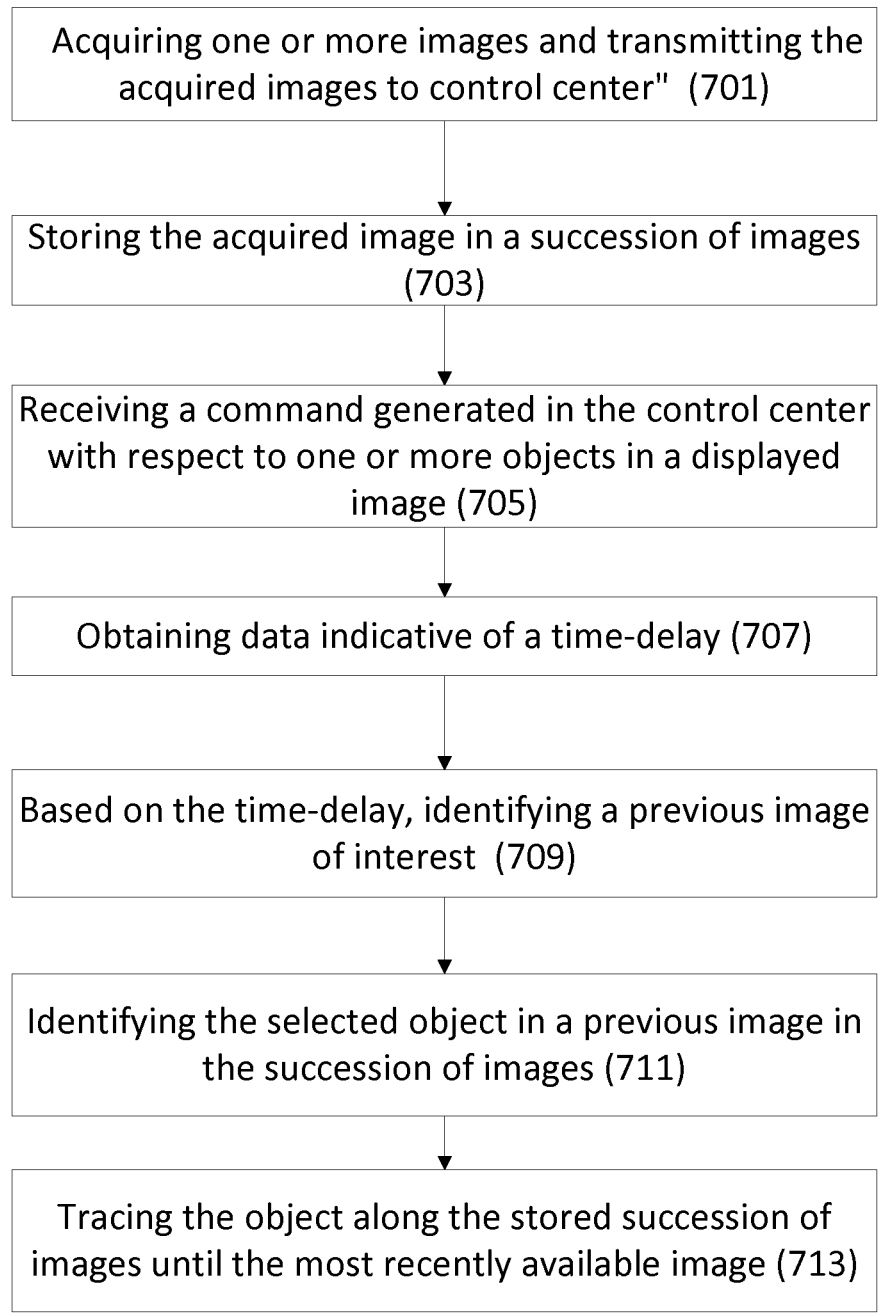
FIG. 7 is another flowchart illustrating operations performed by a sensing unit, in accordance with the presently disclosed subject matter.

FIG. 7 is a flowchart illustrating operations performed by the sensing unit, in accordance with the presently disclosed subject matter.

Images which are captured by sensing unit 110 are transmitted to control center 120 (block 701). An acquired image is stored in a data-repository in a succession of images including previously captured images (703). As mentioned above the images are stored such that the order of capturing of the images can be later retraced. Images (sensing-data) which are received at control center 120 are displayed on a display.

One or more objects can be selected in a given image which is displayed at control center 120 and a command can be generated with respect to the selected object(s). A command generated in control center 120 with respect to one or more objects in a displayed image is received at the control center 110 (block 705). Optionally, the received command can include object-data of the selected object(s).

At the sensor unit 110 an estimated time-delay is obtained, between the time when the given image (the previous image of interest) was captured at the sensing unit 110 until the time a command with respect to that image, generated at control center 120, is received at sensing unit 110 (block 707). The time-delay can be provided to sensing unit 110 or be calculated at the sensing unit as described above.

At block 709 the given image is identified in the stored succession of images, based on the time-delay. The previous image of interest was captured at a time preceding the time of the latest image by a period of time substantially equal to the time-delay.

As mentioned above, this can be accomplished by various types of calculations. Thus, according to one example, the time-delay is provided in terms the equivalent number of images the given image is the image preceding the latest captured image, in the succession of images, by a the specified number of images.

According to another example, the given image is identified based on the frame rate of image sensor 113. Knowing the time-delay and the frame rate, the number of frames (images) which were captured since the image of interest was captured, can be estimated. Assuming N images were captured since the previous image of interest, the previous image of interest can be identified by locating in the stored succession of images, an image, captured N images before the most recently captured image.

Once the previous image of interest is identified, the selected object is identified in the image e.g. based on the respective object-data received in the command (block 711).

Optionally, a subset of images can be searched for the selected object. For example, in case the selected object is not found in the identified previous image of interest, the selected object can be searched in one or more adjacent images in the succession of images.

Once the selected object is identified, the object is traced along the stored succession of images until the most recently available image (block 713). After the selected object is identified in the most recently available image, the received command can be executed with respect to the selected object.

As mentioned above, in case the selected object is not found in the most recently available image, the current location of the selected object is estimated and direction command is generated to the sensor, such that the selected object is located in a real-time image of the scene.

Accordingly, there is provided an additional method and system which enables to locate an object selected in an image displayed at the control center, and execute a command with respect to the selected object, notwithstanding a time-delay between the time the sensing unit acquired the image to a time when the command is received from the control center, at the sensing unit with respect to the selected object.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory (including non-transitory computer memory such as a computer hard-drive or flash memory) tangibly embodying a program of instructions executable by the machine for executing the method of the presently disclosed subject matter.

It should be further understood that certain embodiments of the presently disclosed subject matter are applicable to the architecture of a computer system described with reference to FIGS. 1, 2 and 6. However, the invention is not bound by the specific architecture; equivalent and/or modified functionality may be consolidated or divided in another manner and may be implemented in any appropriate combination of software, firmware and hardware. In different embodiments of the invention the functional blocks and/or parts thereof may be placed in a single or in multiple geographical locations (including duplication for high-availability).

Sensing unit 110 and control center 120 illustrated in FIGS. 1, 2 and 6 each comprise or are otherwise associated with at least one processor (140 and 150 respectively) operable for executing operations as described herein. The term "processor" should be expansively construed to cover any kind of electronic device with data processing capabilities, including, by way of non-limiting example, a personal computer, a computing system, a processor (e.g. digital signal processor (DSP), a microcontroller, a field programmable gate array (FPGA), an application specific integrated circuit (ASIC), etc.), any other electronic computing device, and/or any combination thereof. Operative connections between the blocks and/or within the blocks may be implemented directly (e.g. via a bus) or indirectly, including remote connection.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A tracking system comprising:
   a sensing unit operable to communicate over a communication link with a control center located remotely from the sensing unit, the sensing unit comprising:
   a processor;
   a data-repository; and
   an image sensor operable to capture a succession of images of a scene;
   the sensing unit being operable to:
   identify, using the processor, one or more objects in a first image in said succession of images;
   tag, using the processor, at least one of said objects with a first object-tag, thereby generating a respective tagged object;
   transmit, using the processor, sensing-data to said control center, said sensing-data including at least said first image;
   store, using the data-repository, said first object-tag along with data indicative of a position of the respective tagged object;
   trace, using the processor, the stored tagged object, from said first image in said succession of images to a later image in said succession of images, thereby maintaining a given object-tag associated with its respective tagged-object along said succession of images;
   in case said position of the respective tagged object in said first image is changed in the later image, update, using the processor, the stored data indicative of the position of the respective tagged object stored in the data-repository;
   receive, using the processor, a command from said control center, the command including a second object-tag incorporated in the command, the second object-tag being indicative of a selected object, and the command also including at least one instruction related to the selected object;
   identify, using the processor, with the help of said first object-tag stored in the data-repository and the second object-tag received with the command, said selected object in a latest available captured image in said succession of images, wherein said identifying includes using the received second object-tag to search the data-repository for the stored first object-tag that corresponds to the second object-tag, and using the updated position data stored in the data-repository associated with the first object-tag to locate the selected object in the latest available captured image; and
   execute, using the processor, said at least one instruction with respect to the selected object without being prevented by a time-delay between a time when the sensing unit acquires the latest available captured image with the selected object and a time when the corresponding command is received at the sensing unit due to the identifying of the selected object in the latest available captured image by using the first and second object-tags.

2. The tracking system according to claim 1, wherein said sensing-data further includes said first object-tag.

3. The tracking system according to claim 1, further comprising said control center, the control center being operable to receive said first image from the sensing unit; identify one or more objects in said first image; assign an object-tag to at least one of said objects thereby generating a parallel tagged object; store said object-tag in association with the parallel tagged object; said identification and assigning is performed in the sensing unit and the control center according to identical principles.

4. The tracking system according claim 1, further operable, in case said selected object is not located inside a field of view of said image sensor, to estimate a real-time location of the selected object; and generate direction commands to said image sensor, such that said selected object is located in a real-time image of the scene generated by the image sensor.

5. The tracking system according to claim 1, wherein said command is a tracking command, instructing said sensing unit to track the selected object.

6. The tracking system according to claim 1, further operable to:
determine one or more characteristics of said one or more identified objects; and
select an object to be assigned with a respective object-tag, in case one or more characteristics of the object match a predefined criterion.

7. The tracking system according to claim 1, further operable, responsive to a received screening command including data indicative of at least one selected object, to:
determine object-data of said at least one selected object;
select one or more objects to be assigned with a respective object-tag from among said one or more identified objects, in case object-data of said one or more identified objects match the object-data of said at least one selected object.

8. The tracking system according to claim 1, wherein said image sensor is a camera.

9. The tracking system according to claim 1, further comprising said control center; said control center being operable to receive a captured image from said sensing unit; and display said image on a display operatively connected to the control center;
said control center is further operable, responsive to a selection of an object in said image, to identify an object-tag associated with said object, generate said command, and transmit said command to said sensing unit.

10. The tracking system according to claim 1, wherein said sensing unit is located on an airborne vehicle and said control center is located on the ground.

11. A computer-implemented method of tracking objects by a sensing unit operable to communicate over a communication link with a control center located remotely from the sensing unit, the method comprising:
capturing a succession of images of a scene;
identifying one or more objects in a first image in said succession of images;
tagging at least one of said objects with a first object-tag, thereby generating a respective tagged object;
transmitting sensing-data to said control center, said sensing-data including at least said first image;
storing said first object-tag along with data indicative of a position of the respective tagged object;
tracing the stored tagged object, from said first image in said succession of images to a later image in said succession of images, thereby maintaining a given object-tag associated with its respective tagged-object along said succession of images;
in case said position of the respective tagged object in said first image is changed in the later image, updating the stored data indicative of the position of the respective tagged object;
receiving a command from said control center, the command including a second object-tag incorporated in the command, the second object-tag being indicative of a selected object, and the command also including at least one instruction related to the selected object;
identifying, with the help of said stored first object-tag and the second object-tag, said selected object in a latest available captured image in said succession of images, wherein said identifying includes using the received second object-tag to search for the stored first object-tag that corresponds to the second object tag, and using the updated position data associated with the first object-tag to locate the selected object in the latest available captured image; and
executing said at least one instruction with respect to the selected object without being prevented by a time-delay between a time when the sensing unit acquires the latest available captured image with the selected object and a time when the corresponding command is received at the sensing unit due to the identifying of the selected object in the latest available captured image by using the first and second object-tags.

12. The method according to claim 11, wherein said sensing-data further includes said first object-tag.

13. The method according to claim 11, further comprising:
at the control center:
receiving said first image;
identifying one or more objects in said first image;
assigning an object-tag to at least one of said objects thereby generating a parallel tagged object;
storing said object-tag in association with the parallel tagged object; wherein said identification and assigning is performed in the sensing unit and the control center according to identical principles.

14. The method according to claim 11, further comprising:
estimating a real-time location of the selected object, in case said selected object is not located inside a field of view of said image sensor; and
generating direction commands to said image sensor, such that said selected object is located in a real-time image of the scene generated by the image sensor.

15. The method according to claim 11, further comprising:
determining one or more characteristics of said one or more identified objects; and
selecting an object to be assigned with a respective object-tag, in case one or more characteristics of the object match a predefined criterion.

16. The method according to claim 11, further comprising responsive to a received command, including data indicative of at least one selected object;

determining object-data of said at least one selected object; and selecting one or more objects to be assigned with a respective object-tag from among said one or more identified objects, in case object-data of said one or more identified objects match the object-data of said at least one selected object.

17. The method according to claim 11, further comprising:

receiving at the control center a captured image from said sensing unit;

displaying said image on a display;

responsive to a selection of an object in said image:
identifying an object-tag associated with said object;
generating said command; and
transmitting said command to said sensing unit.

18. The method according to claim 11, wherein images in said succession of images are captured by an image sensor in said sensing unit.

19. The method according to claim 11, wherein said sensing unit comprises a processor and a data-repository.

20. A program storage device readable by machine, tangibly embodying a program of instructions executable by the machine to perform computer-implemented method steps of tracking objects by a sensing unit operable to communicate over a communication link with a control center located remotely from the sensing unit, the method comprising:

capturing a succession of images of a scene;

identifying one or more objects in a first image in said succession of images;

tagging at least one of said objects with a first object-tag, thereby generating a respective tagged object;

transmitting sensing-data to said control center, said sensing-data including at least said first image;

storing said first object-tag along with data indicative of a position of the respective tagged object;

tracing the stored tagged object, from said first image in said succession of images to a later image in said succession of images, thereby maintaining a given object-tag associated with its respective tagged-object along said succession of images;

in case said position of the respective tagged object in said first image is changed in the later image, updating the stored data indicative of the position of the respective tagged object;

receiving a command from said control center, the command including a second object-tag incorporated in the command, the second object-tag being indicative of a selected object, and the command also including at least one instruction related to the selected object;

identifying, with the help of said stored first object-tag and the second object-tag, said selected object in a latest available captured image in said succession of images, wherein said identifying includes using the received second object-tag to search for the stored first object-tag that corresponds to the second object tag, and using the updated position data associated with the first object-tag to locate the selected object in the latest available captured image; and executing said at least one instruction with respect to the selected object without being prevented by a time-delay between a time when the sensing unit acquires the latest available captured image with the selected object and a time when the corresponding command is received at the sensing unit due to the identifying of the selected object in the latest available captured image by using the first and second object-tags.

21. The program storage device readable by machine according to claim 20, wherein said sensing-data further includes said first object-tag.

22. The program storage device readable by machine according to claim 20, wherein the method further comprises, in case said selected object is not located, to estimate a real-time location of the selected object, and generate direction commands for an image sensor.

* * * * *